UNITED STATES PATENT OFFICE.

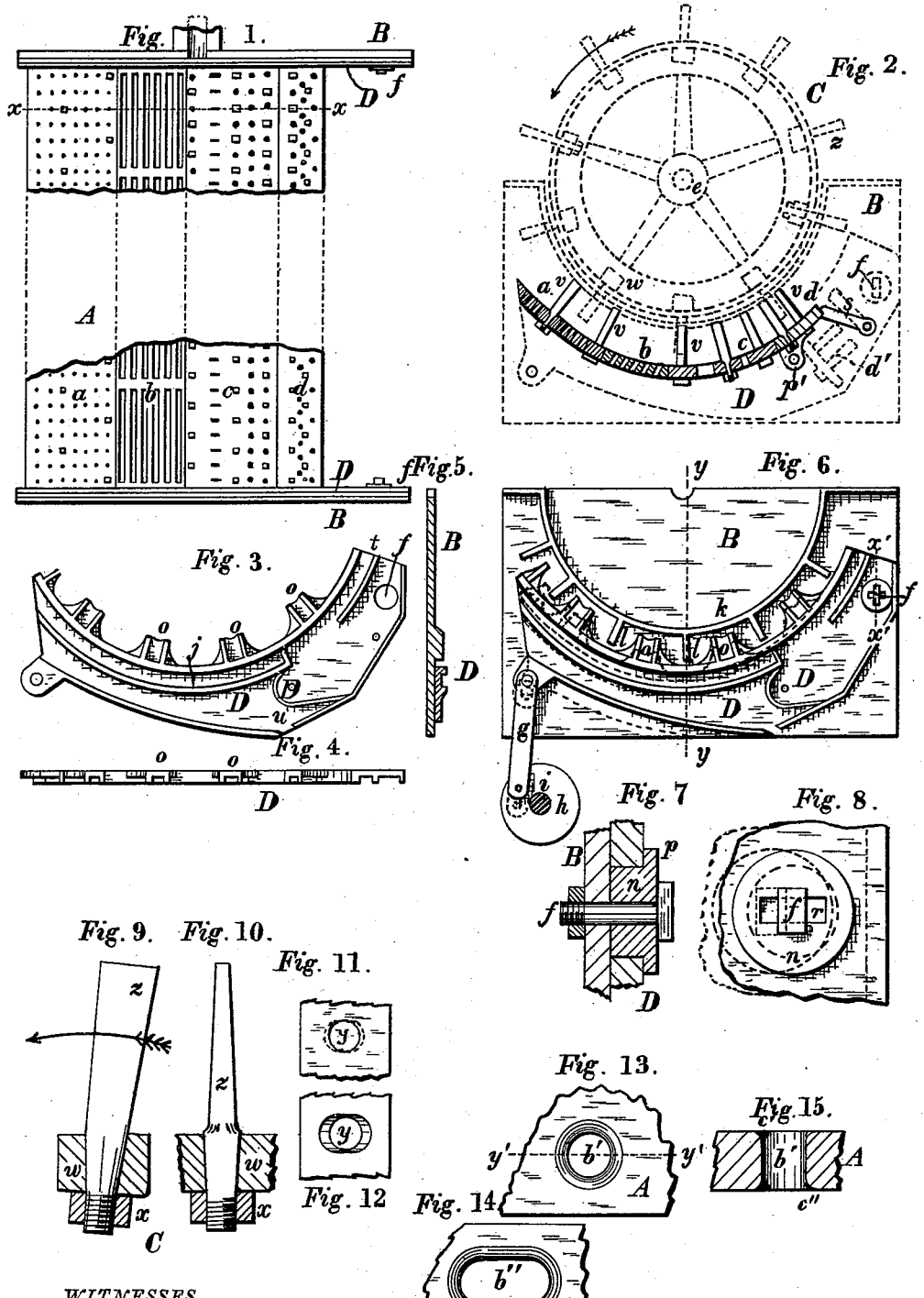

ARTHUR JOHNSTON, OF LOCKPORT, NEW YORK.

THRASHING-MACHINE.

SPECIFICATION forming part of Letters Patent No. 400,217, dated March 26, 1889.

Application filed January 5, 1886. Renewed May 28, 1888. Serial No. 275,323. (No model.)

*To all whom it may concern:*

Be it known that I, ARTHUR JOHNSTON, of Lockport, Niagara county, New York, have invented certain Improvements in Thrashing-Machines, of which the following is a specification, reference being had to the accompanying drawings.

My invention relates to certain improvements in thrashing-machines, which improvements are fully described in the following specification, and the novel features thereof specified in the annexed claims.

In the accompanying drawings, representing my improvements in thrashing-machines, Figure 1 is a plan view of the concave. Fig. 2 is a transverse section on the line $x\, x$, Fig. 1, showing the cylinder, end plate, and adjustable segment in dotted lines. Fig. 3 is a side elevation of the adjustable segment. Fig. 4 is a plan view of the same. Fig. 5 is a section of the end plate and adjustable segment on the line $y\, y$, Fig. 6. Fig. 6 is an elevation of the end plate as seen from the inside, and of the adjustable segment. Fig. 7 is a section through the slotted collar on the line $x'\, x'$, Fig. 6. Fig. 8 represents the manner of adjusting the bracket by means of the slotted collar. Fig. 9 is a side view of one of the reversible teeth of the cylinder. Fig. 10 is an edge view of the same. Figs. 11 and 12 are respectively views of the inside and outside of one of the cylinder-bars, showing the openings for the insertion of the reversible teeth. Fig. 13 represents a portion of the concave, showing the form of the openings through it. Fig. 14 represents the same, showing an elongated opening. Fig. 15 is a section of the concave on the line $y'\, y'$, Fig. 13.

In the accompanying drawings, representing my improvements in thrashing-machines, A is the concave, which consists of four sections, $a\, b\, c\, d$. B B represent the end plates, and C the revolving cylinder.

D is the adjustable segment which supports the ends of the concave.

The end plates are attached to the frame of the machine in any ordinary or usual manner, and they are provided with suitable journals, which support the shaft of the revolving cylinder C. The segments are pivoted to the end plates by the bolts $f\, f$, their forward ends being supported by the links $g$, attached to the cranks $h$, so that they may be adjusted up and down, so as to vary the position of the concave relatively to the cylinder, as indicated by the full and dotted lines in Fig. 6. The crank $h$ is attached to the shaft $i$, which extends across the machine, and is provided with cranks and links at both sides, so that both ends of the concave are raised or lowered at the same time.

In Fig. 6 I have shown the crank and link at one side of the machine, a similar crank and link being employed at the other side.

The shaft is provided with a ratchet, and a pawl engaging with the ratchet is attached to the frame of the machine, by which means the proper adjustment of the concave is secured. The arrangement for this purpose may be substantially similar to that shown in my patent, No. 164,178, June 8, 1875. The ends of the sections $a\, b\, c$ are inserted into the groove $j$, Fig. 3, in the segment D. The last section, $d$, of the concave is arranged to be depressed or thrown out of action when desired, as hereinafter described.

The arrangement of the teeth in the sections of the concave is represented in Fig. 2, the space between the teeth $v$ being decreased from the front to the back or discharge edge of the concave. By this arrangement I am enabled to secure the retardation of the grain as it passes through between the cylinder and the concave, thereby securing a perfect thrashing of the grain. The relative positions of the teeth and perforations in the concave are indicated in Fig. 1, the teeth being inserted in the square holes represented in said figure. I employ teeth of ordinary form in the concave. The second section, $b$, of the concave I prefer to make an open grate, as represented in the drawings, and in such case it is not provided with teeth. The slots through the section $b$ are made on an angle, as represented in Fig. 2, so as to allow of the escape of the thrashed grain, but not the straw, through the openings in the concave. The slots are inclined backward from the direction of motion of the cylinder for this purpose.

In order to prevent the heads of the grain from passing through unthrashed between the end plates and the ends of the cylinder, I provide the end plates with the semicircular rib $k$, Fig. 6, having short radial ribs $l$ extending outward therefrom for a short distance. I also provide the upper edges of the segments with inwardly-projecting ribs o o, Figs. 3 and 6, which alternate in position with the ribs l on the end plates. These lugs operate to prevent the heads of grain from passing along the end plates and between them and the revolving cylinder, their action being especially beneficial when the concave is depressed. The teeth at the ends of the cylinder revolve close to the ribs and lugs l and o, so that the grain at the ends of the cylinder is as effectively thrashed as at the center. The lugs o are preferably made double, as indicated in the drawings, to secure greater strength and more efficient action. The adjustable segments D are cast in one piece with the lugs and provided with the strengthening-ribs, as shown.

I provide for adjusting the segments at their pivotal points by means of the slotted collars n, which are attached to the end plates by the bolts f, and provided with the flanges p, Fig. 7, which hold the segments in contact with the end plates. The collar is provided with a slot, r, through which the bolt f passes, being provided with a nut on the outside of the end plate. The collar can be revolved in the opening of the segment, so that the slot r may be placed in any position—vertical or horizontal, or at any angle desired—thereby permitting the adjustment of the pivotal points of the segments in any direction to the extent of the length of the slot r in the collar. By this arrangement the concave can be adjusted so that it is concentric with the cylinder and at any desired distance from the points of the teeth, or it may be set so as to be more open at the front in any degree required by the character of the grain to be thrashed.

The last section, d, of the concave, which contains the rows of teeth which are closest together, is provided at each end with lugs p', Fig. 2, which are pivoted to the segments D, so that it may be swung downward or thrown out of action into the position indicated by the dotted lines d', Fig. 2. When the last section d of the concave is depressed, a plain curved plate or shield without teeth is inserted in its place. A plate is used below the concave to convey the thrashed grain passing through the openings in the concave onto the grain-belt at u, Fig. 3. The pivoted pawl s is used to sustain the section d of the concave.

I provide the revolving cylinder C with reversible teeth z, in order to secure greater wearing-surface. In practical use the forward edges of the teeth become worn or rounded, so that they fail to draw the straw properly through the machine. I arrange the teeth so that they may be reversed, thereby doubling their effective life. This result I accomplish by forming the shanks of the teeth of an oval taper, which fit openings of corresponding shape in the bars. The inner ends of the shanks are threaded and provided with nuts x, by which they are secured in the bars. By this construction the teeth are given the proper inclination backward, while at the same time they are capable of being reversed, so as to use both edges. When the teeth become worn on their forward edges, they can be reversed and fresh edges substituted. Thus the teeth are made to do double duty. In Figs. 11 and 12 I have represented the form of the openings y through the bars, into which the oval taper shanks of the teeth are inserted.

In Figs. 13, 14, and 15 I have represented the perforations through the concave, in which both the upper edges, c', Fig. 15, are beveled or rounded to prevent the breaking of the grain, and the lower edges, c'', are made of a similar shape to prevent choking. I have found this arrangement of great benefit in practical use. The perforations may be circular, as represented at b' in Figs. 13 and 15, or elongated, as shown at b'', Fig. 14.

I am aware that thrashing-machine teeth have been heretofore inserted in the cylinder-bars by means of a threaded thimble having a flaring mouth, as shown in Patent No. 282,027, and I am also aware that the teeth provided with recessed shanks have been inserted in the bars at an angle with the radial line, as shown in Patent No. 285,595; but such construction I do not claim, as in my improvement the shanks of the teeth are formed of an oval taper shape and inserted directly into the cylinder-bars in openings of an oval tapering form corresponding with that of the shanks, whereby provision is made for reversing the teeth, while, in consequence of the arrangement of the longest dimensions of the openings transversely of the bars, the teeth are secured in place in either position, with their edges properly presented for action on the grain and their sides parallel to the plane of revolution.

I claim—

1. The combination, with the revolving cylinder of a thrashing-machine, of the end plates, B B, provided with ribs l l, and the adjustable concave-supporting segments D D, having projecting lugs o o, substantially as and for the purpose set forth.

2. The combination, with the end plates and the adjustable concave-supporting segments of a thrashing-machine, of the slotted collars n and bolts f, substantially as described.

3. The combination, with the cylinder-bars of a thrashing-machine provided with oval tapering openings having their longest dimensions arranged parallel to the plane of revolution, of the reversible teeth having oval tapered shanks adapted to fit the openings in the bars, and to secure the teeth in proper position when reversed, substantially as and for the purposes described.

ARTHUR JOHNSTON.

Witnesses:
GEO. B. SELDEN,
J. E. SHARPE.